Nov. 30, 1926. 1,608,502
A. W. GROTE
HYDRAULIC DIFFERENTIAL TRANSMISSION
Filed Sept. 3, 1920 3 Sheets-Sheet 1

Alfred W. Grote Inventor
By his Attorneys Redding & Greeley

Nov. 30, 1926.  1,608,502
A. W. GROTE
HYDRAULIC DIFFERENTIAL TRANSMISSION
Filed Sept. 3, 1920   3 Sheets-Sheet 3

INVENTOR
Alfred W. Grote
BY
Redding & Greeley
his ATTORNEYS

Patented Nov. 30, 1926.

1,608,502

UNITED STATES PATENT OFFICE.

ALFRED W. GROTE, OF BROOKLYN, NEW YORK.

HYDRAULIC DIFFERENTIAL TRANSMISSION.

Application filed September 3, 1920. Serial No. 407,854.

This invention relates to a hydraulic differential transmission designed primarily with reference to its use as a final drive for motor vehicles. The invention has for its general objects to provide at the rear end of a motor vehicle a differential hydraulic transmission which shall have no gears, shall give maximum efficiency providing for the direct transmission of power through a liquid from a driving member to driven members, shall be simple in construction, light in weight, compact, and readily accessible for assembling and disassembling or for inspection and for the replacement of parts.
Hydraulic transmissions of certain types have been proposed but have been unsatisfactory and impracticable because of their cost, complications and inefficiency. In accordance with the present invention the hydraulic transmission for the purpose specified has been reduced to its simplest form, comprising generally a centrifugal pump on the propeller shaft, water wheels on the live axle sections, channels for directing the liquid from the centrifugal pump to the water wheels for propulsion thereof, and controlling valves for regulating the flow of the liquid through said channels for propulsion of the wheels in either direction.
For practical considerations the elements are mounted in a one-piece casing which is closed by suitable plates adapted to be bolted in place or removed with comparative facility. In the casing are cast the liquid channels by which the compartments for the respective wheels are connected and the bearings for the various shafts and the valve members can be cast integral with the cover plates making altogether a simple and inexpensive assembly. Other objects of the invention will appear with greater particularity as the description proceeds, reference being now had to the accompanying drawings for a detailed description of one simple practical embodiment of the improvements.

In the drawings—

As will be understood by one skilled in the art, the hydraulic transmission to be described can be adapted for use under any conditions where there is a propeller shaft and a plurality of driven shafts as between which provision for differential movement is to be made. However, the most useful field of application of the present improvements will probably be found in the automobile art where it can be employed advantageously as the final drive for transmitting the power from the propeller shaft to the two live axle sections of the drive wheels. Important features of construction in the embodiment have been made particularly with reference to such an application, it being necessary in automobile practice, of course, to conform to certain requirements of size, weight, accessibility, etc.

Figure 1:
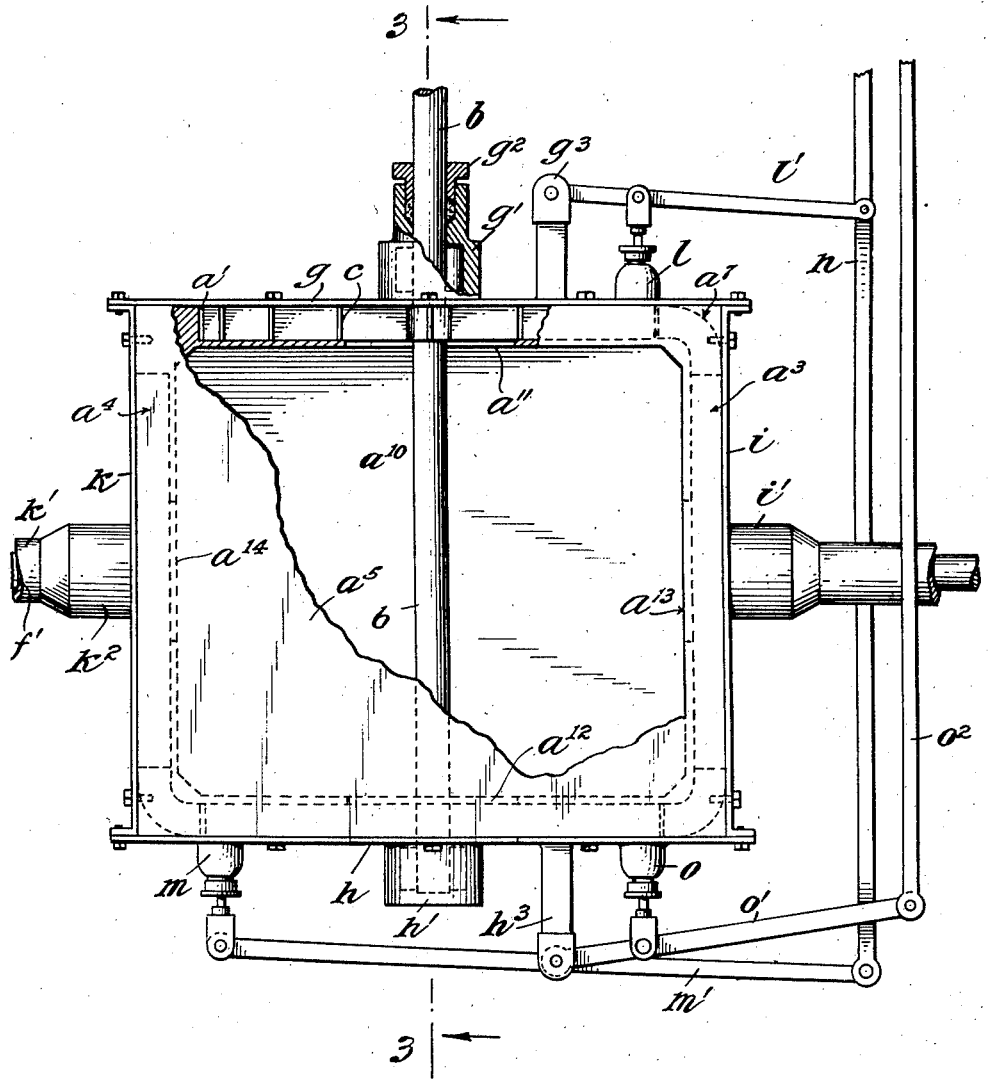
Figure 1 is a view in plan of the improved transmission showing its application as a final drive for motor vehicles, parts being broken away to show details of construction.
Figure 2:
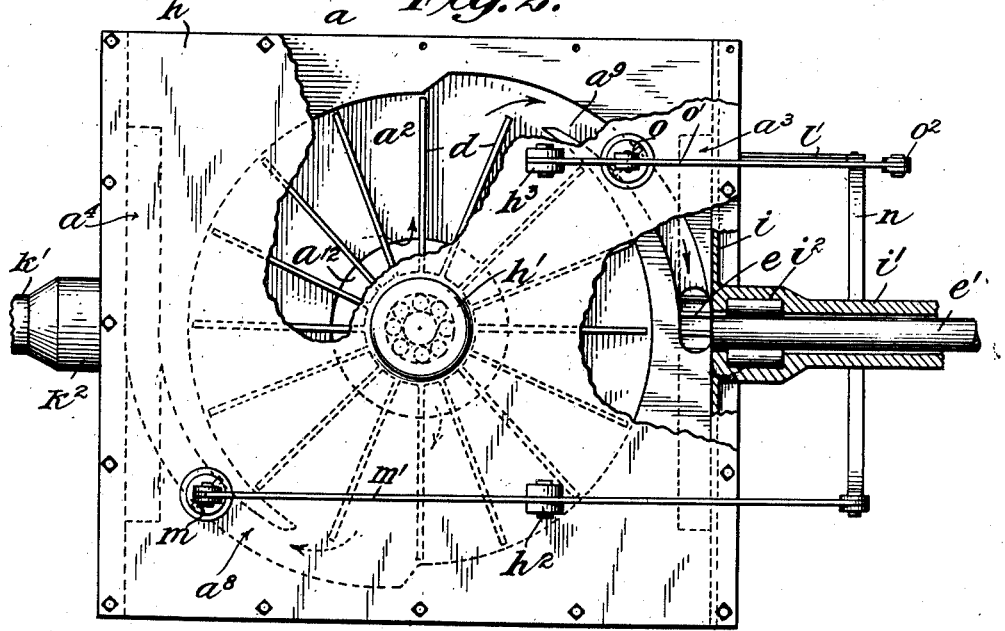
Figure 2 is a view in rear elevation of the transmission shown in Figure 1, parts being broken away.
Figure 3:
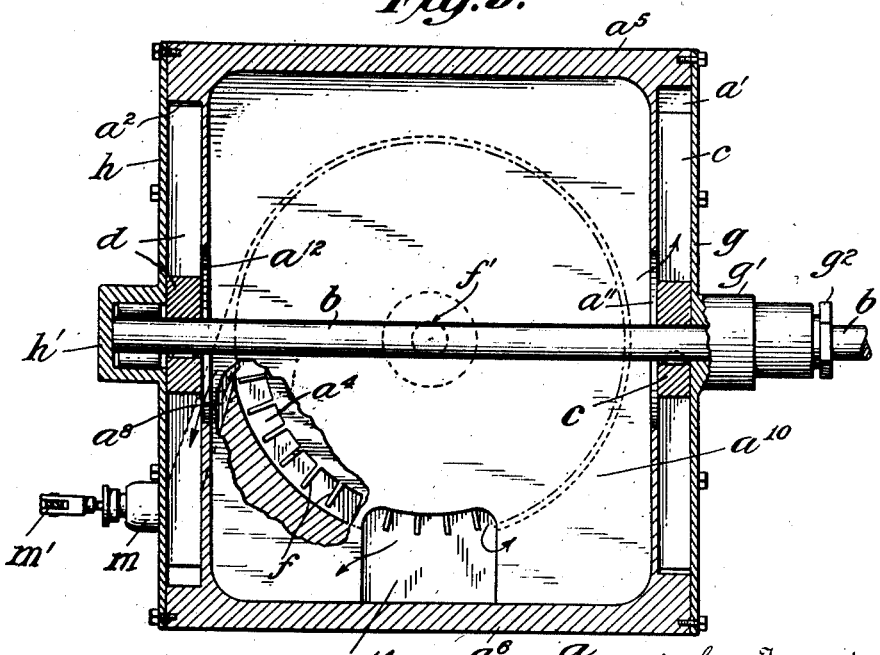
Figure 3 is a view in longitudinal section taken on the plane indicated by the line 3—3 of Figure 1 and looking in the direction of the arrows.
Figure 4:
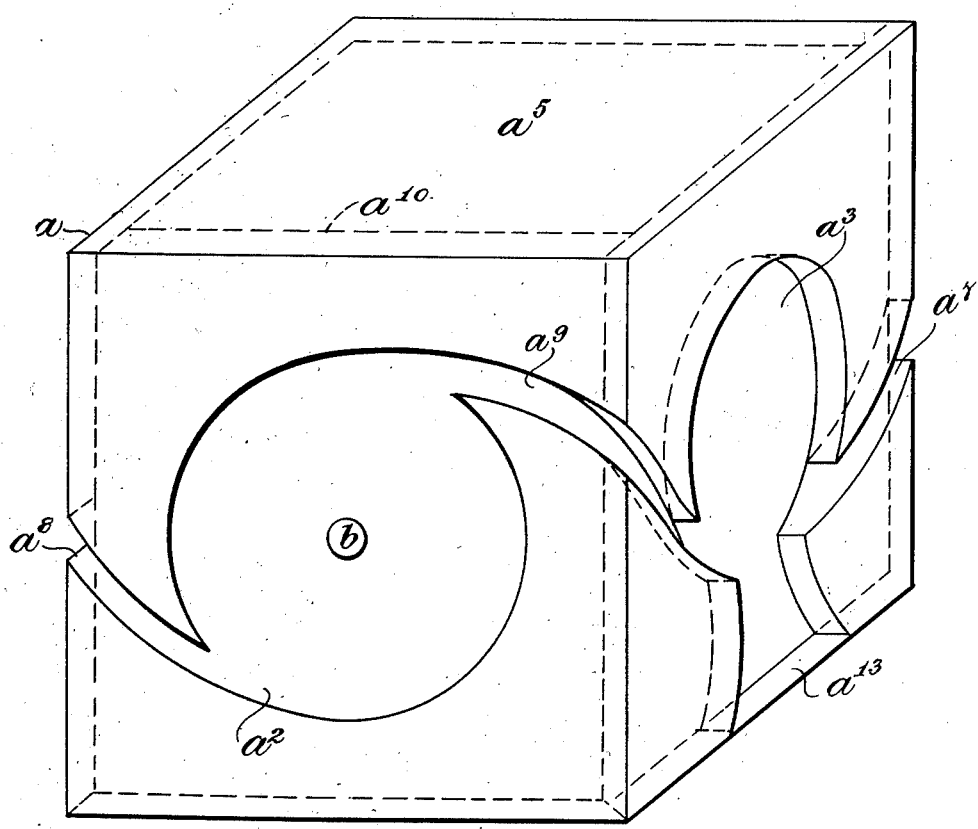
Figure 4 is a view in perspective showing, somewhat schematically, the casing for the transmission and the channels formed therein to afford communication for the fluid between the respective pump and water wheels.

As shown most clearly in Figure 3, there is cast or otherwise formed, preferably as an integral unit, the housing $a$ provided in its front and rear walls with recesses $a'$, $a^2$ respectively, and in its side walls with recesses $a^3$, $a^4$, indicated in dotted lines in Figure 1. The top wall $a^5$ and the bottom wall $a^6$ can be formed integral with the housing. Certain channels are formed in the walls of the housing to place certain of the recesses, such as $a'$, $a^3$, and $a^2$, $a^4$, in communication, for transmission of the liquid, in a manner to be described, and these channels can be arranged at whatever points and in whatever form seems most efficient for their purpose. In the illustrated embodiment there is formed a channel $a^7$ in the upper right hand portion of the front wall of the housing $a$, this channel communicating with the recess $a'$ and with the recess $a^3$ and being generally inclined downwardly, so that the liquid discharged from it into the recess $a^3$ will take a generally downward path. Adjacent the lower left hand portion of the rear wall of the housing $a$ there is formed a channel $a^8$, indicated in dotted lines in Figure 2, which places the recess $a^2$ in communication with the recess

$a^4$, this channel extending generally upwardly, so as to discharge the liquid into the recess $a^4$ in a generally upward direction, as indicated by the upwardly pointing arrow in Figure 2. Adjacent the upper right hand portion of the rear wall of the housing $a$ is formed a channel $a^9$ which places the recess $a^2$ in communication with the recess $a^3$, this channel extending generally downwardly, so as to discharge the liquid in a generally downward direction into the recess $a^3$ to cause a rotation of the paddle wheel in a direction contrary to the direction of its rotation from the flow of the liquid through the channel $a^7$ into the recess $a^3$.

The liquid is contained within the housing in a tank section $a^{10}$, which may be of generally cubical form and made up of the several walls of the housing $a$ hereinbefore described, and this tank communicates through openings $a^{11}$, $a^{12}$, $a^{13}$, $a^{14}$ formed respectively in the four side walls of the tank with the recesses $a'$, $a^2$, $a^3$, $a^4$, respectively. The openings $a^{11}$ and $a^{12}$ may be circular and formed on the longitudinal axis of the tank, while the openings $a^{13}$ and $a^{14}$ are preferably formed in the present embodiment near the bottom of the side walls.

The propeller shaft for a motor vehicle is indicated at $b$ as extending through the opening $a^{11}$ in the front wall of the housing and through the opening $a^{12}$ in the rear wall thereof. This propeller shaft has keyed thereon a centrifugal pump $c$ which is of such form and dimensions as to rest rotatively within the recess $a'$, and also has keyed to it adjacent its rear end a centrifugal pump $d$ which rests rotatively within the recess $a^2$.

Within the recess $a^3$ is mounted rotatively a water wheel $e$ which is keyed on one of the axle sections $e'$, and in the recess $a^4$ is mounted rotatively a water wheel $f$ keyed on the other live axle section $f'$.

The recesses $a'$, $a^2$ can be closed by cover plate $g$, $h$, forming a convenient liquid-tight closure for the housing. The cover plate $g$ may have formed therewith a bearing $g'$ for the propeller shaft $b$ adapted to be closed liquid-tight by a nut $g^2$ forming a stuffing box, while the rear cover plate $h$ may carry therewith a bearing $h'$ for the rear end of the shaft $b$. The side plate $i$ may, if desired, be formed integral with the axle tube $i'$ and have formed therewith a bearing $i^2$ for the axle section $e'$, while the other side plate $k$ may be secured to the axle tube $k'$ and have formed therewith a bearing $k^2$ for the other axle section $f'$.

The tank is filled with any suitable liquid, such as oil, this oil having free access to the recesses $a'$, $a^2$ through the openings $a^{11}$, $a^{12}$. Rotation of the propeller shaft $b$ will cause the blades of the respective pumps $c$, $d$ to pick up the oil and throw it out centrifugally into the respective channels $a^7$, $a^8$. The oil will be discharged by these channels tangentially into the recesses $a^3$, $a^4$ and impinge on the blades of the water wheels $e$, $f$, so as to drive these wheels for forward propulsion of the vehicle. Circulation of the oil back into the tank $a^{10}$ is completed through the openings $a^{13}$, $a^{14}$ in the opposite side walls. Normally, with equal resistance offered to rotation by the axle sections $e'$, $f'$, the two wheels $e$, $f$ will be driven at equal speeds. If, now, one or the other of the axle sections $e'$, $f'$ offers more or less resistance according to the traction conditions, the water wheels $e$, $f$ will be rotated at a differential speed dependent upon such relation of the resistances.

If, now, the channels $a^7$, $a^8$ be closed and the channel $a^9$ opened, the liquid will be forced into the recess $a^3$ and impinge on the blades of the wheel $e$ so as to drive the wheel in a reverse direction, thereby driving the vehicle backwards. For accomplishing this control of forward speeds and reverse, suitable valves can be employed. The valves for controlling the channels $a^7$, $a^8$ may be of any suitable type, such as gate valves, and are indicated conveniently at $l$, $m$, respectively. In Figure 2 valve $m$ is shown in dotted lines as a gate valve extending across the passage $a^8$. Valve $l$ is a similar valve and both these valves are connected by links $l'$, $m'$ respectively to an operating rod $n$, the link $m'$ being pivoted on a bracket $h^2$ to the plate $h$ and the link $l'$ being pivoted to a bracket $g^3$ on the plate $g$. The channel $a^9$ may be controlled by a valve indicated at $o$ connected through a link $o'$ to an operating rod $o^2$, the link $o'$ being pivoted to a bracket $h^3$ on the plate $h$. By operating the rod $n$, the valves $l$, $m$ may be opened to any desired degree or may be entirely closed. By operating the rod $o^2$ the valve $o$ can be opened to any desired degree or closed. In this way, the vehicle can be driven forwardly or rearwardly and the size of the given openings in the channels controlled so as to give different speeds in either direction.

It will be evident that many changes can be made in details of construction while preserving the principle of operation.

I claim as my invention:

1. The combination with a propeller shaft and oppositely disposed driven shafts, of a hydraulic differential transmission comprising a housing, bearings for the propeller shaft in opposed walls of the housing, bearings for the driven shafts in opposed walls of the housing respectively, recesses formed in the walls of the housing, centrifugal pumps carried on the propeller shaft and disposed in recesses in opposed walls respectively, paddle wheels carried on the ends of the driven shafts respectively, and disposed within the respective recesses in the housing walls, a tank for liquid communicating with the pump recesses axially of the pumps and with the paddle wheel recesses adjacent the perimeter thereof and channels formed in the walls of the housing for leading liquid from the periphery of the pumps to the periphery of the paddle wheels.

2. The combination with a propeller shaft and oppositely disposed driven shafts, of a hydraulic differential transmission comprising a housing, bearings for the propeller shaft in opposed walls of the housing, bearings for the driven shafts in opposed walls of the housing respectively, recesses formed in the walls of the housing, centrifugal pumps carried on the propeller shaft and disposed in recesses in opposed walls respectively, paddle wheels carried on the ends of the driven shafts respectively, and disposed within the respective recesses in the housing walls, a tank for liquid communicating with the pump recesses axially of the pumps and with the paddle wheel recesses adjacent the perimeter thereof and channels formed in the walls of the housing for leading liquid from the periphery of the pumps to the periphery of the paddle wheels to drive the paddle wheels in one direction and channels formed in the walls of the housing for leading liquid from the periphery of the pumps to the periphery of the paddle wheels for driving the paddle wheels in an opposite direction.

5. The combination with a propeller shaft and oppositely disposed driven shafts, of a hydraulic differential transmission comprising a housing, bearings for the propeller shaft in opposed walls of the housing, bearings for the driven shafts in opposed walls of the housing respectively, recesses formed in the walls of the housing, centrifugal pumps carried on the propeller shaft and disposed in recesses in opposed walls respectively, paddle wheels carried on the ends of the driven shafts respectively, and disposed within the respective recesses in the housing walls, a tank for liquid communicating with the pump recesses axially of the pumps and with the paddle wheel recesses adjacent the perimeter thereof, channels formed in the walls of the housing for leading liquid from the periphery of the pumps to the periphery of the paddle wheels to drive the paddle wheels in one direction, channels formed in the walls of the housing for leading liquid from the periphery of the pumps to the periphery of the paddle wheels for driving the paddle wheels in an opposite direction, and valves to control the flow of liquid through the channels.

4. In combination with a propeller shaft and oppositely disposed driven shafts, a hydraulic differential transmission comprising a housing having recesses formed in its front and rear walls, a centrifugal pump mounted fixedly on the propeller shaft in each recess, the wall of each recess being formed with an opening to place the central portion of said pump in communication with the interior of the housing, a water wheel secured to the driven shafts, respectively, said housing being formed in each opposite side wall with a recess to receive a water wheel the wall of each of the last named recesses being formed with an opening to afford communication between the outer portion of the water wheel and the interior of the housing, channels in said housing to conduct liquid from each pump to the periphery of its respective water wheel whereby both driven shafts may be rotated in the same direction, other channels in said housing to conduct liquid from the pumps to the periphery of the water wheels respectively to drive said wheels in the opposite direction, cover plates for all of the recesses bolted to the housing, bearings for the propeller shaft and driven shafts carried by the plates, valves carried by the plates to control the flow of liquid through the channels, operating means for the valves controlling the flow of liquid in the first mentioned channels and separate operating means for the valves controlling the flow of liquid in the second mentioned channels.

This specification signed this 2d day of September A. D. 1920.

ALFRED W. GROTE.